(12) United States Patent
Fricker

(10) Patent No.: US 8,937,465 B2
(45) Date of Patent: Jan. 20, 2015

(54) ACTIVE VOICE BAND NOISE FILTER

(75) Inventor: Jean-Philippe Fricker, Mountain View, CA (US)

(73) Assignee: Alcatel Lucent, Boulogne Billancourt (FR)

( * ) Notice: Subject to any disclaimer, the term of this patent is extended or adjusted under 35 U.S.C. 154(b) by 838 days.

(21) Appl. No.: 13/025,787

(22) Filed: Feb. 11, 2011

(65) Prior Publication Data

US 2012/0206116 A1    Aug. 16, 2012

(51) Int. Cl.
| | | |
|---|---|---|
| G05F 1/00 | (2006.01) | |
| H02M 3/158 | (2006.01) | |
| H02M 1/15 | (2006.01) | |
| H02M 1/00 | (2006.01) | |

(52) U.S. Cl.
CPC ............... H02M 3/158 (2013.01); *H02M 1/15* (2013.01); *H02M 2001/007* (2013.01)
USPC ........................................................ 323/274

(58) Field of Classification Search
USPC ......... 323/223, 224, 234, 265, 271, 273, 274, 323/282, 284–286
See application file for complete search history.

(56) References Cited

U.S. PATENT DOCUMENTS

| | | | | |
|---|---|---|---|---|
| 4,160,288 | A * | 7/1979 | Stuart et al. | 363/41 |
| 8,476,882 | B2 * | 7/2013 | Luo et al. | 323/282 |
| 2002/0000243 | A1 * | 1/2002 | Ganz | 136/244 |
| 2007/0153560 | A1 * | 7/2007 | Zhang et al. | 363/166 |
| 2008/0285317 | A1 * | 11/2008 | Rotzoll | 363/80 |
| 2009/0027928 | A1 * | 1/2009 | Dong et al. | 363/50 |
| 2010/0109572 | A1 * | 5/2010 | Kamoi et al. | 315/307 |
| 2010/0188015 | A1 * | 7/2010 | Korsunsky et al. | 315/294 |
| 2012/0133345 | A1 * | 5/2012 | Tai et al. | 323/282 |

* cited by examiner

*Primary Examiner* — Adolf Berhane
*Assistant Examiner* — Jeffrey Gblende
(74) *Attorney, Agent, or Firm* — McCormick, Paulding & Huber LLP

(57) ABSTRACT

Systems and methods for actively reducing or eliminating conducted noise from power provided to DC circuits include a current sensor, a boost converter, a buck converter, and energy supply capacitors. The current sensor senses the input current provided by the power source. The boost converter increases the voltage level above that provided by the power source while maintaining current at or near the level sensed by the current sensor, and while also maintaining a charge on the energy supply capacitors. The buck converter is powered by the output from the boost converter and provides an output voltage to a load. The operation of the boost converter and the buck converter may be controlled to maintain a continuous and low ripple current from the power source and to maintain a continuous and low ripple voltage to the load.

20 Claims, 3 Drawing Sheets

ACTIVE VOICE BAND NOISE FILTER

FIELD OF THE INVENTION

The present invention relates to systems and methods for filtering noise from electronic circuits and, more particularly, to noise-filtering electronic circuits for use in telecommunications equipment.

BACKGROUND OF THE INVENTION

Electromagnetic interference (EMI), sometimes called radiofrequency interference (RFI), may be generated by any change in an electrical current that passes through a device or a circuit. The extent of the interference is a function of the amplitude of the change in the current. Conducted noise, which is a form of interference that may be generated within electrical equipment such as rotating electrical machines, results from unwanted conducted voltages and currents that travel through input or output lines, control leads or power conductors.

Direct current (DC) motors and engines may generate conducted noise in any number of ways. For example, voltage transients that are created as brushes slide across a commutator bar, or as brushes transfer from one commutator bar to another, may generate interference particularly in low frequency ranges. Moreover, current ripples created by commutation or other sources may create an undesirable audio-frequency hum.

Many existing power supplies are designed to maintain a steady output voltage and to filter out high frequency noise. Low frequency noise, such as that which is generated by the commutation of coils of a DC motor or engine, is not easily filtered by existing systems and methods, however. For this reason, many common low frequency conducted noise sources, such as ripples in DC voltage or current, are generally permitted to transfer through power supplies to components. Problems associated with EMI or RFI in general, and with conducted noise in particular, may become more and more prevalent as electronic components shrink in size, operate at high power, or utilize computing devices that are clocked at high frequencies.

Recently implemented electrical infrastructure requirements, such as those set forth in Section 10 of the GR-1089-CORE Network Equipment-Building System (NEBS) standards, have limited the amount of noise that may be generated in the low frequency range commonly known as the "voice band," which extends approximately from 300 Hz to 3400 Hz and is utilized for voice transmission and/or data communications.

Many systems and methods have attempted to address the problems associated with conducted noise in DC components. One such solution is to install decoupling capacitors in close proximity to the offending DC component, such as a fan installed into a fan tray with a local fan controller printed circuit board. Installing decoupling capacitors near the controller board minimizes the lengths of the wires between the fan motor and the capacitors, thereby minimizing their natural inductance and improving the filtering performance of the capacitors. However, it is not always possible to install capacitors adjacent to components, especially in miniature electronic circuitry. If the capacitors cannot be installed near the DC equipment, long wires—which can create very inductive paths that require more elaborate filters—may be required to connect the capacitors to the equipment.

Another solution is to install a passive inductor-capacitor (LC) combination filter in series with the offending DC component. However, in order to filter conducted noise from the low frequency voice band, the inductors and/or capacitors in an LC combination filter must often be very large and may require complex materials and geometries which can greatly increase the cost of such systems, and may further complicate their installation into equipment.

SUMMARY OF THE INVENTION

The present invention is directed to systems and methods for actively limiting or minimizing conducted noise in DC circuits in the low frequency range known as the "voice band." Such noise, which is commonly generated in DC-powered fan trays that blow forced air through or around electrical components, can impair the overall quality of performance of the particular components.

In a currently preferred embodiment, the present invention is an active filter that includes a current sensor, a boost converter and a buck converter which act in combination to filter out some root causes of low frequency conducted noise, such as voltage or current ripples, from a DC power signal. The current sensor generally measures the rate of the current entering the boost converter, and also provides current to a feedback loop of the boost converter, wherein the current provided to the feedback loop is a small fraction of the current entering the boost converter. The boost converter includes an inductor that acts as an energy storage device for providing a voltage that maintains a charge on one or more energy storage capacitors at or near the constant current rate sensed by the current sensor. A small fraction of the output voltage from the boost converter is returned to the boost converter as negative feedback, in order to regulate the output voltage of the boost converter by controlling the average current passing through the inductor. The buck converter generally provides an output voltage level that is suitable for a particular DC load at a variable current rate, and may discharge the energy storage capacitors as necessary in order to maintain the output voltage level.

The present invention is intended to overcome the disadvantages of the prior art by providing active filters that utilize commercial off-the-shelf technology to minimize conducted noise in DC circuits. The active filters disclosed herein may be combined with standard DC-powered equipment, such as cooling fan trays, and do not require large or customized capacitors, inductors or other components. Moreover, the active filters disclosed herein provide more precise control of the output voltage and dissipate less power than filters that may incorporate large standard inductors or capacitors. Additionally, by utilizing both a boost controller and a buck controller, the systems and methods disclosed herein permit the filtering of low frequency noise from DC circuits at virtually any input and/or output voltage ratios.

DETAILED DESCRIPTION

Figure 1:
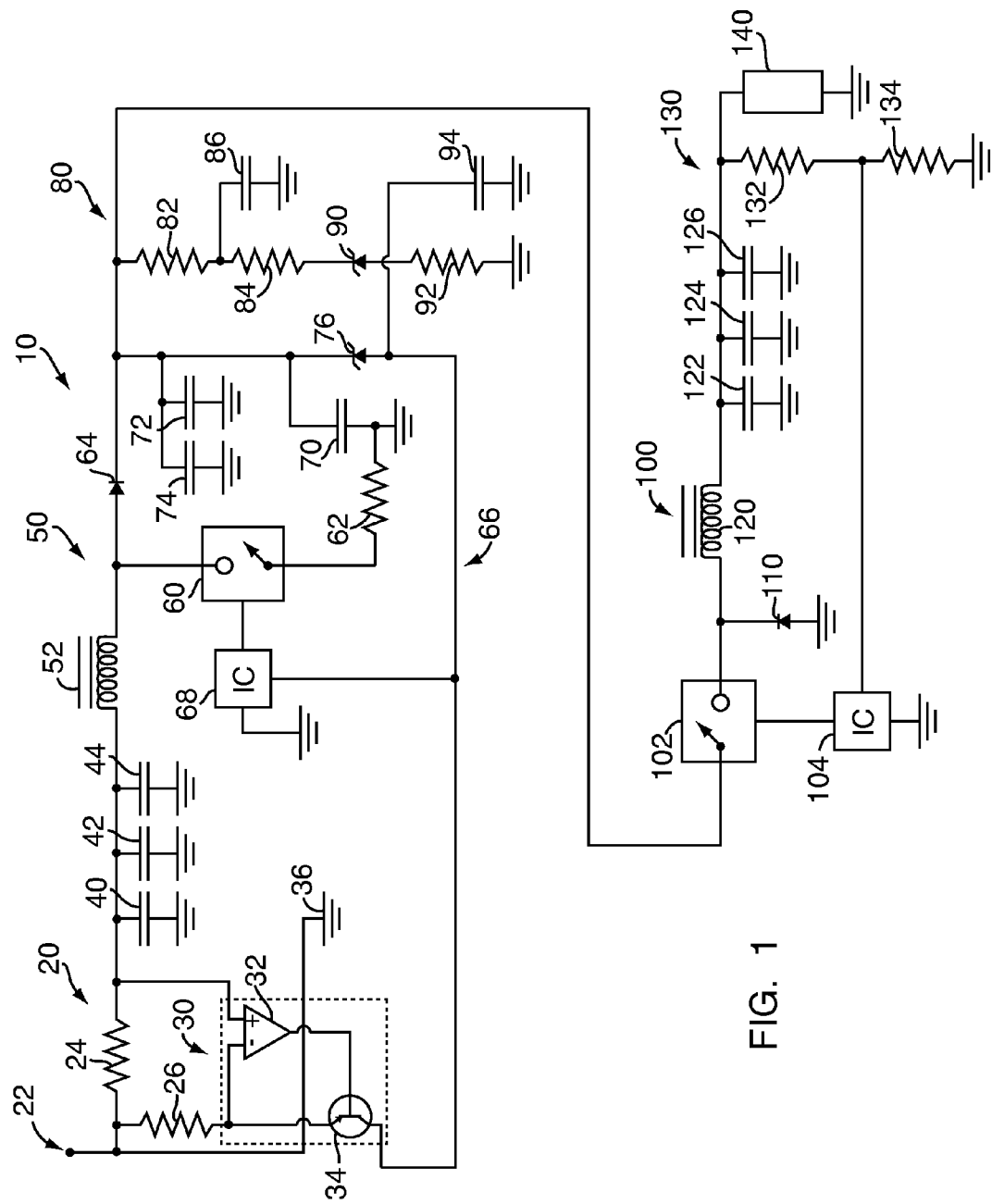
FIG. 1 is an electrical schematic of an active filter according to one embodiment of the present invention.

Referring to FIG. 1, an active filter 10 according to one embodiment of the present invention is shown. The active filter 10 shown in FIG. 1 also includes a current sensor 20, a boost converter 50 and a buck converter 100 connected in series with a load 140. The active filter 10 also includes a pair of energy storage capacitors 70, 72, a diode 76, and a low-pass filter circuit 80.

The current sensor 20 may be any conventional device or component for sensing DC current that is known to those of skill in the art. In the embodiment of the present invention shown in FIG. 1, and as is shown in greater detail in FIG. 2, the current sensor 20 is a high-side current sensor that includes a sense resistor 24, a gain resistor 26 and a current amplifier 30. During operation, an input voltage $V_{IN}$ is applied to current sensor 20 from power source 22. Current sensor 20 monitors the voltage drop $V_{24}$ across sense resistor 24, which has a resistance $R_{24}$ that is relatively low compared to the resistance $R_{26}$ of the gain resistor 26, in order to determine the amount of current $I_{24}$ flowing across sense resistor 24 and entering the boost converter 50.

The voltage drop $V_{24}$ across sense resistor 24 may be calculated as the product of the current $I_{24}$ passing through the sense resistor 24 and the resistance $R_{24}$ of the sense resistor 24, or $V_{24}=I_{24} \cdot R_{24}$, while the voltage drop $V_{26}$ across the gain resistor 26 may be calculated as the product of the current $I_{26}$ passing through the gain resistor 26 and the resistance $R_{26}$ of the gain resistor 26, or $V_{26}=I_{26} \cdot R_{26}$. The resistance $R_{24}$ of the sense resistor 24 and the resistance $R_{26}$ of the gain resistor 26 may be selected as desired in order to determine the "current gain" of the current sensor 20, i.e., the ratio of the resistance $R_{24}$ of the sense resistor 24 to the resistance $R_{26}$ of the gain resistor 26. Therefore, because the voltage drop $V_{24}$ across resistor 24 and the voltage drop $V_{26}$ across the gain resistor 26 are equal, or $V_{24}=V_{26}$, transistor 34 will conduct a current $I_{26}$ across gain resistor 26 that is equal to the current $I_{24}$ across sense resistor 24 multiplied by the current gain of the amplifier 30, or $I_{26}=I_{24} \cdot (R_{24}/R_{26})$. The current $I_{24}$ flowing across the sense resistor 24 subsequently enters boost converter 50, while the current $I_{26}$ flowing across the gain resistor 20 enters the current amplifier 30. In a preferred embodiment, sense resistor 24 may be a surface-mounted resistor having a resistance of approximately 0.010 ohms (Ω), while gain resistor 26 may also be a surface-mounted resistor having a resistance of approximately 320 ohms (Ω).

Figure 2:
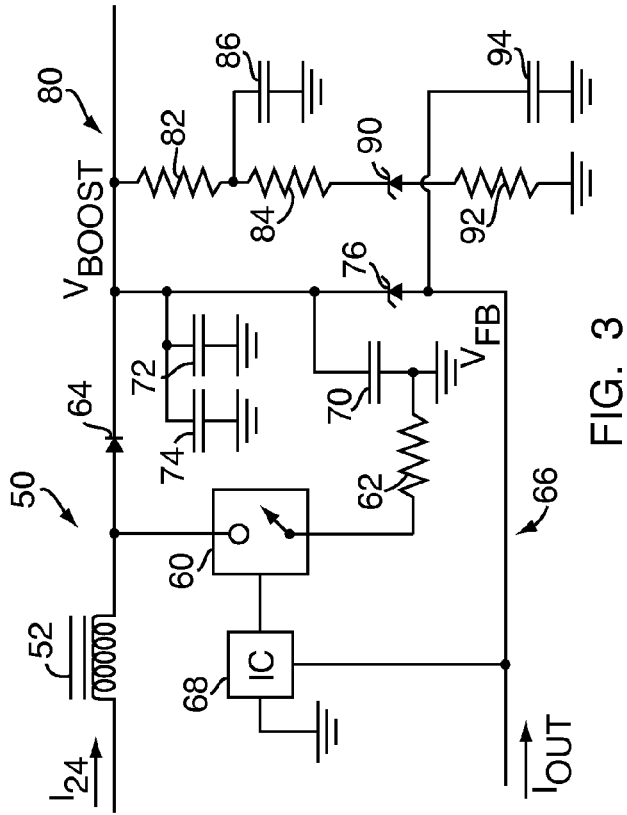
FIG. 2 is an electrical schematic of a current sensor according to another embodiment of the present invention.

In the embodiment shown in FIG. 1, and in greater detail in FIG. 2, the current amplifier 30 includes operational amplifier (OPAMP) 32 and transistor 34. The operational amplifier 32 is set to drive the base of the transistor 34 to null the voltage across its positive and negative inputs. Since the positive and negative inputs of operational amplifier 32 have very high impedances by definition, the currents flowing through these inputs are extremely small compared to the current $I_{24}$ flowing through the sense resistor 24 or the current $I_{26}$ flowing through the gain resistor 26. As such, substantially all of the current $I_{26}$ flowing through the gain resistor 26 also flows to the transistor 34. Furthermore, because the current $I_{BASE}$ flowing through the operational amplifier 32 to the base of the transistor 24 is considered to be negligible compared to the current $I_{26}$ flowing through the gain resistor 26, which is substantially proportional to the current $I_{24}$ flowing through the sense resistor 24 and into the boost converter 50, the output current $I_{OUT}$ flowing from the transistor 34 to the boost converter 50 is also substantially proportional to the current $I_{24}$.

Moreover, because the resistance $R_{26}$ of the gain resistor 26 is much larger than the resistance $R_{24}$ of the sense resistor 24, the current $I_{26}$ flowing through gain resistor 26 is much smaller than the current flowing through sense resistor 24. Therefore, the output current $I_{OUT}$ flowing from transistor 34 to the feedback loop 66 is a small fraction of the current $I_{24}$ flowing through the sense resistor 24. In an exemplary embodiment of the present invention, the current $I_{24}$ passing through the sense resistor 24 is 4 amperes (A), and the output current $I_{OUT}$ passing from transistor 34 to feedback loop 66 is 125 microamperes (μA).

As is shown in FIG. 1, one or more bypass capacitors may be installed downstream of the current sensor 20 in order to dampen some of the effects of any ripples that may be present in the DC signal. By their nature, capacitors act as a short circuit to alternating current (AC) signals, and as an open circuit to DC signals. Therefore, bypass capacitors permit ripples in the DC signal to be shorted to ground while maintaining the voltage level of the DC signal substantially constant. The number and capacitances of the bypass capacitors 40, 42, 44 may be selected in order to accommodate different variations in the DC voltage at different frequencies. In the configuration of the active filter 10 shown in FIG. 1, three bypass capacitors 40, 42, 44 are included. In a preferred embodiment, the active filter 10 may include a 0.1 microfarad (μF) capacitor 40, to provide effective impedance at high frequencies, and one or more 22 microfarad (μF) capacitors 42, 44, to provide effective impedance at low frequencies, based on the particular characteristics of the DC voltage signal and the load 140. Any number of bypass capacitors of any capacitances may be used in accordance with the teachings of the present invention, however.

Figure 3:
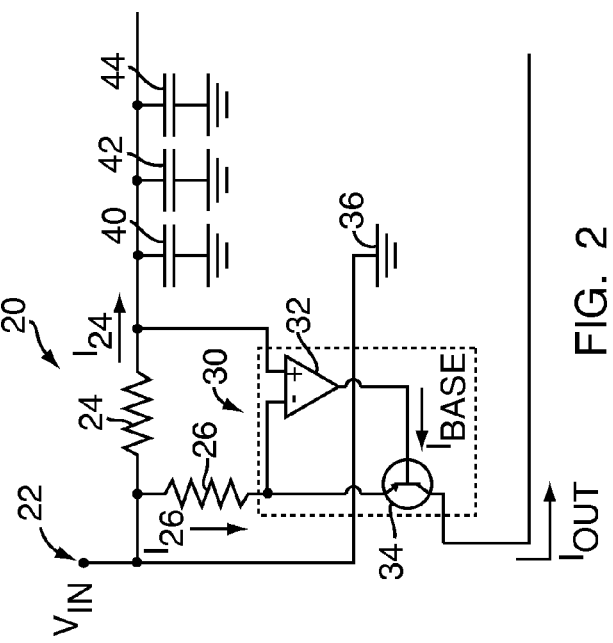
FIG. 3 is an electrical schematic of a boost converter and related components according to another embodiment of the present invention.

As is also shown in FIG. 1, and in greater detail in FIG. 3, the boost converter 50 includes inductor 52, switch 60, diode 64 and energy storage capacitors 70, 72, 74. The boost converter 50 utilizes inductor 52 as an energy storage device for maintaining a charge on the energy storage capacitors 70, 72, 74 at a substantially constant average rate of current that is approximately equal to the current $I_{24}$ across sense resistor 24.

The boost converter 50 stores energy in the magnetic field of inductor 52 and distributes power to the buck converter 100 at an output voltage level $I_{BOOST}$ that exceeds the voltage $V_{IN}$ provided by the power source 22. Because inductors are naturally resistant to changes in current, inductors may be used to reduce current ripples in a DC signal. As is recognized by those of skill in the art, the voltage $V_L$ across an inductor is proportional to the rate of change of the current $I_L$ passing through the inductor, according to the equation $V_L=L \cdot (dI_L/dt)$, where L is the inductance of the inductor and $dI_L/dt$ is the instantaneous rate of change in the current $I_L$ passing through the inductor. In a steady-state condition, i.e., when the current $I_{52}$ passing through inductor 52 is constant, $dI_{52}/dt$ is zero, and the voltage $V_{52}$ across the inductor 52 is also zero.

When switch 60 is initially closed, inductor 52 enters the "on-state," and the current $I_{52}$ passing through inductor 52, switch 60 and resistor 62 increases exponentially over time, thereby increasing the amount of energy stored in the magnetic field of the inductor 52. Additionally, as current $I_{52}$ asymptotically approaches a peak value, the instantaneous rate of change $dI_{52}/dt$ approaches zero, and the voltage $V_{52}$ on the inductor 52 exponentially decays to zero. As energy storage capacitors 70, 72, 74 begin to charge, the current sensor 30 injects a small input current $I_{OUT}$ to the feedback loop 66, which induces a voltage drop $V_{92}$ across resistor 92 and places a charge on capacitor 94.

When switch 60 is subsequently opened, i.e., in the "off-state" of inductor 52, current is discharged from inductor 52 through diode 64 at a voltage level that is significantly higher than the voltage ($V_{IN}$-$V_{24}$) applied to the inductor 52, due to high $dI_{52}/dt$ experienced upon the opening of switch 60. This phenomenon is commonly referred to as "inductive kick," which occurs as the magnetic field that had been generated by the inductor 52 and used to store energy therein begins to collapse. Alternately closing and opening switch 60 can maintain a consistently high $dI_{52}/dt$ within the inductor 52, and, therefore, can maintain a high voltage $V_{52}$ on the inductor 52. As such, the boost converter 50 maintains an output voltage $V_{BOOST}$ at a level that exceeds the voltage applied to the inductor 50 by approximately $V_{52}$.

By controlling the frequency at which the switch 60 is cycled, and the "duty cycle" of the boost controller 50, a substantially constant absolute rate of change $dI_{52}/dt$ may be maintained within the inductor 52, because the current $I_{52}$ passing through the inductor 52 will vary at the same frequency as the cycling of the switch 60. The substantially constant absolute rate of change $dI_{52}/dt$ results in a positive voltage $V_{52}$ on the inductor 52, and creates an output voltage level $V_{BOOST}$ that exceeds the input voltage $V_{IN}$. The output voltage level $V_{BOOST}$ of the boost converter 50 thus maintains a higher level of charge on the energy storage capacitors 70, 72, 74 than that which could have been achieved using the input voltage $V_{IN}$.

The cycling of switch 60 creates a ripple current in the boost converter 50, due to the changes in the current $I_{52}$ passing through the inductor 52. Capacitor 94 is provided to filter the high frequency components of any ripples in the current in the boost converter 50, thereby filtering any ripples in the current that might be provided to the boost converter via feedback loop 66.

Switch 60 may be any form of switching apparatus that can be opened and closed, as needed, to maintain a desired output voltage level $V_{BOOST}$ from the boost converter 50. The operation of switch 60 may be controlled by a variety of means, such as an integrated circuit 68, as is shown in FIGS. 1 and 3. For example, switch 60 may be a transistor, such as a bipolar transistor, an insulated gate bipolar transistor (IGBT) or a metal-oxide-semiconductor field effect transistor (MOSFET), and the switch 60 may be operated by manipulating the base voltage to a bipolar transistor or the gate voltage to an IGBT or a MOSFET. In a preferred embodiment, the integrated circuit 68 may also perform current monitoring functions, such as calculating the current passing through switch 60 by measuring the voltage drop $V_{62}$ across resistor 62 and dividing the drop by the resistance $R_{62}$ of resistor 62.

In the embodiment of the present invention shown in FIG. 1, the operation of the switch 60 is controlled by providing a feedback voltage $V_{FB}$ to the integrated circuit 68 via feedback loop 66 to regulate the overall output voltage $V_{BOOST}$ from the boost converter 50. The feedback voltage $V_{FB}$ is defined as the voltage drop $V_{92}$ across resistor 92, and is a fraction of the overall output voltage $V_{BOOST}$.

As the output voltage $V_{BOOST}$ of the boost converter 50 increases, the voltage across zener diode 90 also increases. Once the difference between the output voltage $V_{BOOST}$ of the boost converter 50 and the feedback voltage $V_{FB}$, or ($V_{BOOST}$-$V_{FB}$), exceeds the breakdown voltage $V_{Z90}$ of the zener diode 90, current $I_{90}$ will flow through zener diode 90 in the reverse direction and across resistors 82, 84, to feedback loop 66. The component of this feedback current may be calculated as $I_{90}=(V_{BOOST}-V_{FB}-V_{Z90})/(R_{82}+R_{84})$, wherein $R_{82}$ and $R_{84}$ are the resistances of resistor 82 and resistor 84, respectively. As will be recognized by those of skill in the art, the feedback current $I_{90}$ is proportional to the output voltage $V_{BOOST}$. In this manner, zener diode 90 prevents the boost converter 50 from reducing the current to the buck converter 100 until the output voltage $V_{BOOST}$ has reached a minimum threshold.

The energy storage capacitors 70, 72, 74 provide an energy reserve to ensure that the voltage $V_{LOAD}$ applied to the load 140 is sufficient. As is set forth above, the boost controller 50 may be used to maintain a higher level of charge on one or more energy storage capacitors than would be possible using the input voltage $V_{IN}$ alone, and at or near the constant current rate $I_{24}$ sensed by the current sensor 20. As is shown in FIGS. 1 and 3, energy storage capacitors 70, 72, 74 are maintained in parallel, downstream of boost converter 50. Although FIG. 1 and FIG. 3 each show three energy storage capacitors 70, 72, 74, any number of energy storage capacitors may be used in accordance with the present invention, and both the number and the capacitances of the energy storage capacitors may be selected based on the topography of the particular application and the voltage required by load 140. For example, energy storage capacitors 70, 72, 74 may each be rated at 100 volts (V) and have capacitances of about 220 microfarads (μF).

As the output voltage $V_{BOOST}$ from the boost converter 50 increases, the current $I_{50}$ passing through the voltage divider created by resistors 82, 84 also increases, as does the voltage $V_{FB}$ across resistor 92. When the feedback provided through feedback loop 66 increases, the boost converter 50 will reduce the current $I_{FB}$ from the sense resistor 24 to the feedback loop 66, which will, in turn, reduce the voltage across resistor 92 and the voltage $V_{FB}$. Thus, as output voltage $V_{BOOST}$ increases, the boost controller 50 reduces the current $I_{52}$ passing through inductor 52.

To prevent the output voltage $V_{BOOST}$ from the boost converter 50 increasing above the maximum operating input voltage to the buck converter 100 in the absence of a load 140, a zener diode 76 is used to conduct current $I_{76}$ in the reverse direction once the difference between the output voltage $V_{BOOST}$ and the feedback voltage $V_{FB}$ exceeds the breakdown voltage $V_{Z76}$ of the zener diode 76.

This current $I_{76}$ will increase the voltage across resistor 92, and therefore increase the feedback voltage $V_{FB}$. The boost converter will then reduce the average current $I_L$ passing through the inductor 52 accordingly. In the embodiment shown in FIG. 1, the zener diode 76 does not have a voltage divider, and any increase in the output voltage $V_{BOOST}$ will be reflected directly upon the feedback loop 66, effectively capping the output voltage $V_{BOOST}$ as necessary.

The voltage divider created by resistors 82, 84, 92 of the low-pass filter circuit 80 acts on the boost converter 60 to either decrease or increase the amount of energy transferred to the energy storage capacitors 70, 72, 74 as the output voltage of the boost convert $V_{BOOST}$ either increases or decreases, respectively. Together with resistors 82, 84, the capacitor 86 acts as a low pass filter, to dampen the voltage ripples generated by the current drawn by the load 140.

Preferably, the predetermined breakthrough voltage $V_{Z90}$ of zener diode 76 exceeds the predetermined breakthrough voltage $V_{Z90}$ of zener diode 90. As such, zener diode 76 and zener diode 90 may be used to shift the dynamic range of operating voltages within the absolute maximum and absolute minimum operating conditions of the system. If the system is rated to operate between 0 and 44 volts (V), zener diode 76 and zener diode 90 may be selected to limit the range of operation to between, for example, 12 and 33 volts (V).

The low-pass filter circuit 80 also attenuates high frequency signals from the power signal while allowing low frequency signals to pass through to the buck converter 100. Because the load 140 draws a discontinuous current, the energy storage capacitors 70, 72, 74 are discharged at a discontinuous rate in order to maintain voltage $V_{LOAD}$ on the load while being charged at a constant current rate by the boost converter 50. The continuous charging and discontinuous discharging of the energy storage capacitors 70, 72, 74 can create a ripple in the output voltage $V_{BOOST}$. Therefore, to avoid propagating such voltage ripples directly to the feedback loop 66, which would therefore induce ripples in the current passing through sense resistor 24, capacitor 86 acts as a low-pass filter. However, a low-pass filter of any capacity and of any order may be used in accordance with the teachings of the present invention.

Figure 4:
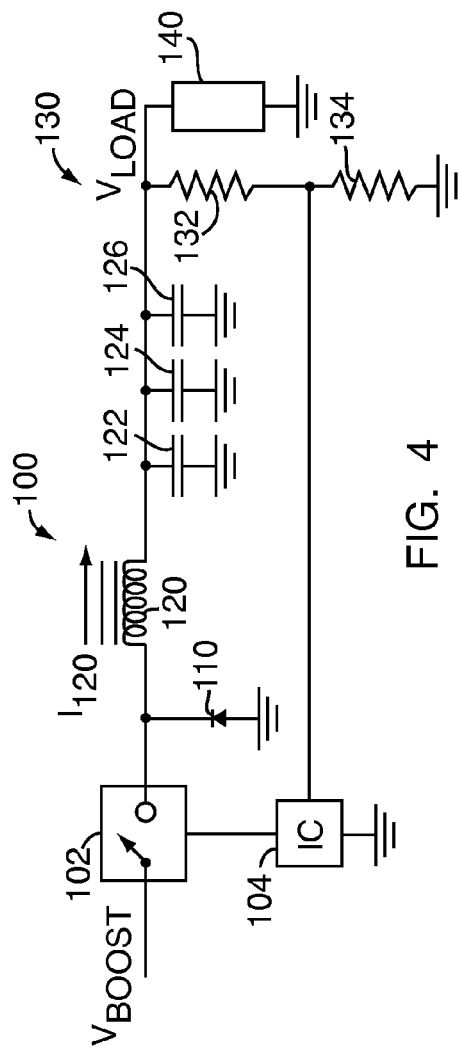
FIG. 4 is an electrical schematic of a buck converter and related components according to another embodiment of the present invention.

As is also shown in FIG. 1, and in greater detail in FIG. 4, the active filter 10 includes a buck converter 100 that provides a predetermined voltage $V_{LOAD}$ to the load 140 and includes a switch 102, an inductor 120, a diode 110, energy storage capacitors 122, 124, 126 and a voltage divider 130. Like the boost converter 50, the buck converter 100 operates by storing energy in the magnetic field of inductor 120, and maintains the voltage on the load 140 at a desired level by cycling the switch 102. Preferably, the buck converter 100 is adapted to maintain a 12 volt (V) output voltage on the load 140.

When switch 102 is initially closed, the buck converter 100 is in the "on-state," and voltage $V_{BOOST}$ is applied to the inductor 120. Current $I_{120}$ passing through the inductor 120 begins to increase in the forward direction generally linearly, i.e., $dI_{120}/dt$ is substantially constant, and the energy stored in the magnetic field of inductor 120 likewise increases. When switch 102 is opened, i.e., in the "off-state" of the buck converter 100, the voltage $V_{BOOST}$ is removed from the inductor 120, which becomes the sole source of power to load 140. Inductor 120 reverses polarity as energy is released from inductor 120 and the current passing through the inductor 120 falls linearly. By controlling the frequency at which the switch 102 is cycled, and the "duty cycle" of the buck controller 100, a substantially constant absolute rate of change $dI_{120}/dt$ may be maintained within the inductor 120, because the current $I_{120}$ passing through the inductor 120 will vary at the same frequency as the cycling of the switch 120 a substantially constant absolute rate of change $dI_{120}/dt$ may be maintained, and a desired voltage level $V_{LOAD}$ may be applied to load 140. The operation of switch 102 may be controlled by a variety of means, such as an integrated circuit 104. For example, switch 102 may be a transistor, such as a bipolar transistor, an IGBT or a MOSFET, and the switch 102 may be operated by manipulating the base voltage to a bipolar transistor or the gate voltage to an IGBT or a MOSFET.

One or more bypass capacitors may be installed downstream of inductor 120 to dampen some of the effects of the voltage ripples in the DC voltage applied to load 140 from the buck inductor 120. In the configuration of the active filter 10 shown in FIG. 1, three bypass capacitors 122, 124, 126 are included. As with the bypass capacitors 40, 42, 44, the number and capacitances of the bypass capacitors 122, 124, 126 may be selected in order to accommodate different variations in the output voltage $V_{LOAD}$ at different frequencies, however.

As is also shown in FIG. 1, and in greater detail in FIG. 4, voltage divider 130 includes resistors 132, 134, and feedback loop 136, which provides feedback to the integrated circuit 104. The resistances of resistors 132, 134 may be selected as necessary in order to control the operation of switch 102 and to maintain the output voltage level on load 140 as desired.

Figure 5:
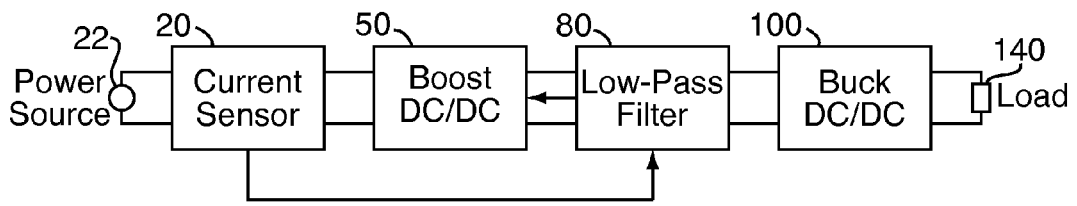
FIG. 5 is a block diagram of components according to another embodiment of the present invention.
Figure 6:
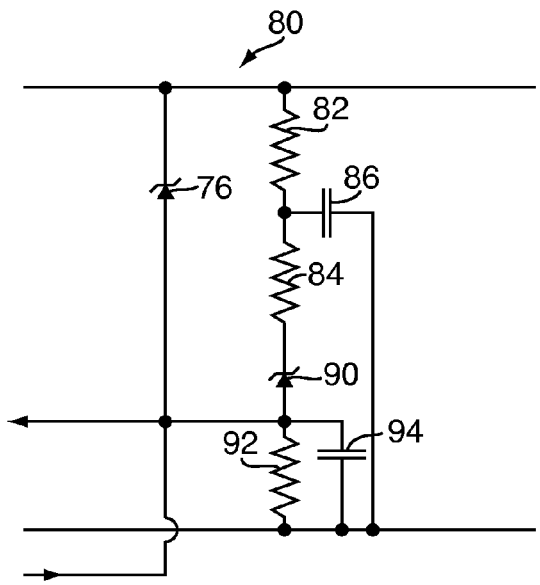
FIG. 6 is an electrical schematic of a filter circuit and related components according to another embodiment of the present invention.

A block diagram depicting the general relationship between components of an embodiment of the present invention is shown in FIG. 5. The embodiment shown in FIG. 5 includes a power source 22, a current sensor 20, a boost converter 50, a low-pass filter circuit 80 and a buck converter 100 providing power to load 140. An embodiment of a low-pass filter circuit 80 is shown in FIG. 6. The embodiment shown in FIG. 6 includes a diode 76, resistors 82, 84, 92, a diode 90 and capacitors 86, 94.

In a currently preferred embodiment of the present invention, in order to filter conducted noise from a DC circuit providing an output voltage of approximately 12 volts (V), current amplifier 30 may be a small-outline transistor current sensor having multiple pin terminals, and may contain an internal sense amplifier 32 and an internal PNP transistor 34. Inductor 52 may preferably have an inductance of approximately 10 microhenries (μH). Switch 60 may preferably be an N-channel metal-oxide-semiconductor field effect transistor (MOSFET) controlled by boost controller 68.

Additionally, a currently preferred embodiment of the present invention may include a synchronous step-down DC/DC converter as the buck converter 100. The buck converter 100 may also include an internal switch 102 and an internal diode 110 to control the application of power to inductor 120, and can receive feedback from the voltage divider 130 to modify the operation of the switch 102 in order to maintain the output voltage on the load 140 as necessary.

The systems and methods disclosed herein are particularly relevant to 12 volt (V) applications, such as those utilized in fan tray systems for cooling components. However, the systems and methods herein can be utilized at any voltage levels, including 48 volt (V) systems or even larger capacity systems, including those operating at 100 to 200 volts (V) or more. Moreover, the number and capacitances of the energy storage capacitors may also be selected based on the load on the system, and additional energy storage capacitors may be added in parallel as necessary to maintain the total energy storage capacitance of the system.

One advantage of the present invention is that it provides an active filter using commercial off-the-shelf technology to minimize conducted noise in DC circuits. Another advantage of the present invention is that the active filters disclosed herein may be combined with standard DC-powered equipment, such as cooling fan trays, and do not require large or customized capacitors, inductors or other components. A further advantage of the present invention is that the active filters can provide more precise control of the output voltage and dissipate less power than filters that may incorporate large standard inductors or capacitors. Additionally, by utilizing both a boost controller and a buck controller, the systems and methods disclosed herein permit the filtering of low frequency noise from DC circuits at virtually any input and/or output voltage ratios.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, the current sensor 20 represented in FIGS. 1, 2 and 5 is not the exclusive means for measuring the average current fed to the boost converter, according to the present disclosure. Current entering the boost converter may be sensed, for example, using a Hall effect sensor. Moreover, current may also be sensed by many other means. For example, as is shown in FIG. 1, the voltage drop across resistor 62 could also be determined in order to sense the current entering the low-pass filter.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A circuit for actively filtering noise from power applied to a load, the circuit comprising:
   a current sensor for sensing an input current;
   a boost converter comprising a first inductor, a first diode, a first switch, and a first integrated circuit for operating the first switch, wherein the boost converter is adapted to provide a boost voltage that is at least as large as an input voltage to the buck converter;
   at least one energy storage capacitor coupled to the circuit downstream of the boost converter;
   a first feedback loop comprising a first zener diode, wherein the first feedback loop is adapted to provide feedback from an output of the boost converter to the first integrated circuit when the boost voltage exceeds a predetermined voltage level by a breakthrough voltage of the first zener diode;
   a low-pass filter downstream of the first feedback loop; and
   a buck converter comprising a second inductor, a second diode, a second switch and a second integrated circuit for operating the second switch, wherein the buck converter is adapted to provide an output voltage to the load at a predetermined output voltage level,
   wherein the low-pass filter comprises a second zener diode and at least one filter capacitor coupled to the circuit and to ground, and
   wherein the low-pass filter is adapted to provide feedback to the first integrated circuit via the first feedback loop.

2. The circuit according to claim 1, further comprising a voltage divider coupled to the circuit downstream of the buck converter, wherein the voltage divider comprises a second feedback loop for providing feedback to the second integrated circuit.

3. The circuit according to claim 1, wherein the predetermined voltage level is 12 volts (V).

4. The circuit according to claim 1, wherein the load comprises at least one fan.

5. The circuit according to claim 2, wherein the voltage divider further comprises two resistors coupled in series to the circuit downstream of the buck converter and to ground and a filtering capacitor coupled to the circuit and to ground,
   wherein the filtering capacitor is coupled to the circuit between the two resistors.

6. The circuit according to claim 1, wherein the current sensor comprises a sense resistor, a gain resistor and a current amplifier.

7. The circuit according to claim 6, wherein the current amplifier further comprises an operational amplifier and at least one transistor.

8. The circuit according to claim 1, further comprising at least one bypass capacitor provided downstream of the current sensor and upstream of the boost converter.

9. The circuit according to claim 8, wherein the at least one bypass capacitor comprises a first bypass capacitor for providing high frequency impedance to the circuit and a second bypass capacitor for providing low frequency impedance to the circuit.

10. The circuit according to claim 9, wherein the first bypass capacitor has a first capacitance of approximately 0.1 microfarad, and
    wherein the second bypass capacitor has a second capacitance of approximately 22 microfarad.

11. A cooling system comprising:
    at least one fan; and
    at least one filtering circuit,
    wherein the at least one filtering circuit is configured to receive an input voltage and an input current,
    wherein the at least one filtering circuit is configured to provide an output voltage and an output current to the at least one fan, and
    wherein the at least one filtering circuit comprises:
       a current sensor for sensing the input current;
       a boost converter comprising a first inductor, a first diode, a first switch, and a first integrated circuit for operating the first switch, wherein the boost converter is adapted to provide a boost voltage that is at least as large as the input voltage to the buck converter;
       at least one energy storage capacitor coupled to the at least one filtering circuit downstream of the boost converter;
       a first feedback loop comprising a first zener diode, wherein the first feedback loop is adapted to provide feedback from an output of the boost converter to the first integrated circuit when the boost voltage exceeds a predetermined voltage level by a breakthrough voltage of the first zener diode;
       a low-pass filter downstream of the first feedback loop; and
       a buck converter comprising a second inductor, a second diode, a second switch and a second integrated circuit for operating the second switch, wherein the buck converter is adapted to provide the output voltage to the at least one fan at a predetermined output voltage level,
       wherein the low-pass filter comprises a second zener diode and at least one filter capacitor coupled to the at least one filtering circuit and to ground, and
       wherein the low-pass filter is adapted to provide feedback to the first integrated circuit via the first feedback loop.

12. The cooling system according to claim 11, wherein the filtering circuit further comprises a voltage divider coupled to the circuit downstream of the buck converter, and
    wherein the voltage divider comprises a second feedback loop for providing feedback to the second integrated circuit.

13. The cooling system according to claim 12, wherein the voltage divider further comprises two resistors coupled in series to the circuit downstream of the buck converter and to ground and a filtering capacitor coupled to the circuit and to ground, wherein the filtering capacitor is coupled to the circuit between the two resistors.

14. The cooling system according to claim 11, wherein the predetermined voltage level is 12 volts (V).

15. The cooling system according to claim 11, wherein the current sensor comprises a sense resistor, a gain resistor and a current amplifier.

16. The cooling system according to claim 11, wherein the current amplifier further comprises an operational amplifier and at least one transistor.

17. The cooling system according to claim 11, further comprising at least one bypass capacitor provided downstream of the current sensor and upstream of the boost converter.

18. The cooling system according to claim 17, wherein the at least one bypass capacitor comprises a first bypass capacitor for providing high frequency impedance to the circuit and a second bypass capacitor for providing low frequency impedance to the circuit.

19. The cooling system according to claim 18, wherein the first bypass capacitor has a first capacitance of approximately 0.1 microfarad, and wherein the second bypass capacitor has a second capacitance of approximately 22 microfarad.

20. The cooling system according to claim 11, wherein the at least one fan is provided in a tray.

* * * * *